(12) United States Patent
Todorovic et al.

(10) Patent No.: US 10,619,565 B2
(45) Date of Patent: Apr. 14, 2020

(54) GAS TURBINE INLET

(71) Applicant: ROLLS-ROYCE DEUTSCHLAND LTD & CO KG, Blankenfelde-Mahlow, Dahlewitz (DE)

(72) Inventors: Predrag Todorovic, Berlin (DE); Thomas Kubisch, Koenigs-Wusterhausen (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 578 days.

(21) Appl. No.: 14/674,400

(22) Filed: Mar. 31, 2015

(65) Prior Publication Data

US 2015/0285144 A1 Oct. 8, 2015

(30) Foreign Application Priority Data

Apr. 8, 2014 (GB) .................... 1406277.2

(51) Int. Cl.
| | |
|---|---|
| F02C 7/045 | (2006.01) |
| F02C 7/04 | (2006.01) |
| B64D 33/02 | (2006.01) |
| F01D 25/24 | (2006.01) |
| F02K 3/06 | (2006.01) |
| B64D 29/02 | (2006.01) |

(52) U.S. Cl.
CPC .............. *F02C 7/045* (2013.01); *B64D 29/02* (2013.01); *B64D 33/02* (2013.01); *F01D 25/243* (2013.01); *F02C 7/04* (2013.01); *F02K 3/06* (2013.01); *Y02T 50/672* (2013.01); *Y10T 137/0536* (2015.04)

(58) Field of Classification Search
CPC . F02C 7/04; F02C 7/045; B64D 29/02; B64D 29/06; B64D 33/02; B64D 2033/0206; F01D 25/243; F02K 3/06; Y10T 137/0536; Y02T 50/672
USPC ....................................... 137/15.1; 29/889.22
See application file for complete search history.

(56) References Cited

U.S. PATENT DOCUMENTS

| | | | |
|---|---|---|---|
| 5,297,765 A | 3/1994 | Hughes et al. | |
| 5,915,403 A | 6/1999 | McConachie et al. | |
| 5,941,061 A * | 8/1999 | Sherry | B64D 29/08 |
| | | | 244/54 |

(Continued)

FOREIGN PATENT DOCUMENTS

| | | |
|---|---|---|
| EP | 2148062 A2 | 1/2010 |
| EP | 2241504 A2 | 10/2010 |

(Continued)

OTHER PUBLICATIONS

Technical Process Bulletin LOCTITE EA 9258.1 AERO, Aug. 2013.*

(Continued)

*Primary Examiner* — Mark A Laurenzi
*Assistant Examiner* — Loren C Edwards
(74) *Attorney, Agent, or Firm* — Oliff PLC

(57) ABSTRACT

An inlet for a gas turbine engine having an inlet lip and an inlet barrel, the inlet lip having a highlight defining a boundary between inner and outer surfaces of the inlet lip. The inlet barrel has a forwardly extending flange that is joined to the inlet lip by overlapping surfaces. The flange interface surface has a conus angle that is divergent from the highlight axis.

16 Claims, 7 Drawing Sheets

(56) References Cited

U.S. PATENT DOCUMENTS

| | | | | |
|---|---|---|---|---|
| 6,027,078 A | * | 2/2000 | Crouch | B64C 21/00 244/130 |
| 2006/0145001 A1 | | 7/2006 | Smith | |
| 2007/0120008 A1 | * | 5/2007 | Conner | B64D 27/20 244/53 B |
| 2010/0122868 A1 | * | 5/2010 | Chiou | B64D 33/02 181/213 |
| 2010/0260602 A1 | * | 10/2010 | Binks | B64D 29/08 415/214.1 |
| 2011/0214405 A1 | | 9/2011 | Joret et al. | |

FOREIGN PATENT DOCUMENTS

| | | |
|---|---|---|
| FR | 2 995 360 A1 | 3/2014 |
| GB | 2288578 A | 10/1995 |
| GB | 2314887 A | 1/1998 |
| GB | 2391284 A | 2/2004 |

OTHER PUBLICATIONS

Aug. 26, 2015 Search Report issued in European Patent Application No. 15161824.

Oct. 6, 2014 Search Report issued in British Application No. GB1406277.2.

\* cited by examiner

GAS TURBINE INLET

The present invention relates to inlets for gas turbine engines and particularly inlets having a nacelle joined to a fan casing.

Gas turbine engines have inlets that serve to limit the disturbance of the air flow as it enters the fan stage of the engine, which is located within a duct. The fan stage has a fan case which ensures that a blade is captured and its energy dissipated in the event of it becoming detached from the hub. Forward of the fan case is an inlet barrel that carries a volume of noise absorbing material such as a honeycomb. Forward of the inlet barrel is a joint with an inlet lip that is a fairing that guides an air flow into the engine duct and an air flow around the outside of the engine.

Gas turbine engines for aerospace applications are carefully manufactured to minimise weight and noise to improve environmental efficiency and reduce the impact on habitation around the airports. This means that many of the materials used are complex with aerodynamic surfaces that need to be carefully aligned to limit the presence of steps and gaps that can cause turbulence or other losses. It is difficult to provide accurate alignment so in order to limit the unnecessary scrapping of components multiple shims are used as interfaces between misalignments. The shims add further cost and complexity both to the architecture and manufacture of the engine and carry increase the risk of ingestion into the engine should the shim become detached for any reason.

It is an object of the present invention to seek to provide an inlet for a gas turbine engine and an improved joint between the inlet barrel and the inlet lip.

According to a first aspect of the invention there is provided an inlet for a gas turbine engine, the inlet having in flow series an inlet lip and an inlet barrel, the inlet lip having a highlight defining a boundary between inner and outer surfaces of the inlet lip, and on all longitudinal sections through the inlet that contain a longitudinal axis of the inlet (i) said inner and outer surfaces having their tangents coincident on the highlight, and (ii) said inner and outer surfaces have their maximum curvature at the highlight, the inlet lip having an axis that extends normal to the highlight plane; wherein the inlet barrel has a forwardly extending flange that is joined to the inlet lip.

The flange may be in the form of a conus i.e. as the flange extends axially forward it diverges from the highlight axis. The local angle of divergence may be constant as the flange extends circumferentially around the axis, but may also have a local angle of divergence that varies as the flange extends circumferentially around the axis. It is preferable that an interface surface of the flange is aligned to a corresponding interface surface of the inlet lip.

Aligning the respective interface surfaces of the flange and the inlet lip means that the use manual shims can be reduced and in many circumstances a liquid shim or adhesive can be used to provide an appropriate joining and sealing Preferably the interface surface on the inlet lip is a radially outwardly facing surface. i.e. it is a surface that does not bound the air intake. Preferably the interface surface on the inlet barrel is a radially inwardly facing surface. The interface surface of the inlet lip is preferably located at the inner trailing edge of the inlet lip.

The interface surfaces are quasi-conical and have no axis of symmetry. Where the local conus angle varies it is preferable that the local conus angle is almost constant to the local tangencies of the air washed surface at the trailing edge of the inlet lip along its circumference.

By varying the local conus angle around the circumference the best fit of the inlet barrel flange and the inlet lip is achieved and the least liquid shim material is required. It can, however, require fairly complex machining operations to get the correct fit.

As an alternative the circumference of one or more of the inlet barrel interface surface or inlet lip interface surfaces may have a constant, or at least less variable conus angle. The conus angle is preferably different to both the highlight axis and the engine axis and is selected to provide the best compromise angle. The angle should preferably continue to permit a liquid shim to provide the sealing and joining between the interface surfaces.

The interface conus angle can be formed by setting the angle of a machining tool relative to the inlet lip or inlet barrel and moving the machine tool relative to the inlet lip or inlet barrel.

Preferably this allows for a liquid shim to be used as a sealing, joining and vibration damping material between the interface surfaces of the inlet lip and inlet barrel. The quasi-conical interfacing surfaces help also in the when bringing the inlet barrel and the inlet lip together on assembly.

Preferably the minimum local conus angle of the flange interface surface and/or the minimum local conus angle of the inlet lip interface surface is 5 degrees from the highlight axis. The maximum local conus angle of the flange interface surface and/or the maximum local conus angle of the inlet lip interface surface may be 11.5 degrees from the axis. More preferably the maximum local conus angles are between 7 degrees and 10 degrees from the tooling axis.

The minimum conus angle of the flange interface surface and/or the minimum conus angle of the inlet lip trailing interface surface may be located at the top dead centre of the gas turbine when viewed from the front of the gas turbine.

The maximum conus angle of the flange interface surface and/or the maximum conus angle of the inlet lip interface surface may be located at the bottom dead centre of the gas turbine when viewed from the front of the gas turbine.

Preferably the rate of change of the conus angle of the flange interface surface and/or the rate of change of the conus angle of the inlet lip interface surface increases to a maximum and then decreases to a minimum around the circumference of the inlet.

The rate of change of the conus angle of the flange interface surface and/or the rate of change of the conus angle of the inlet lip interface surface may be at a minimum at the top dead centre of the gas turbine.

The rate of change of the conus angle of the flange interface surface and/or the rate of change of the conus angle of the inlet lip interface surface may be at a maximum at 90 degrees around the circumference to the top dead centre of the gas turbine.

Preferably the interface is secured together by fasteners and liquid shimming.

The inlet is preferably for a ducted fan gas turbine. Such inlets can have a large diameter within the range of 2 to 4 metres. The angle of the flange can simplify manufacture and reduce the danger of incorrect circumferential alignment of the inlet lip to the inlet barrel.

The arrangement can also allow a greater volume of noise absorbing material to be provided to the inlet barrel and assists in the use of a composite material for the manufacture of the inlet lip.

The invention will now be described by way of example only and with reference to the accompanying drawings in which.

Figure 1:
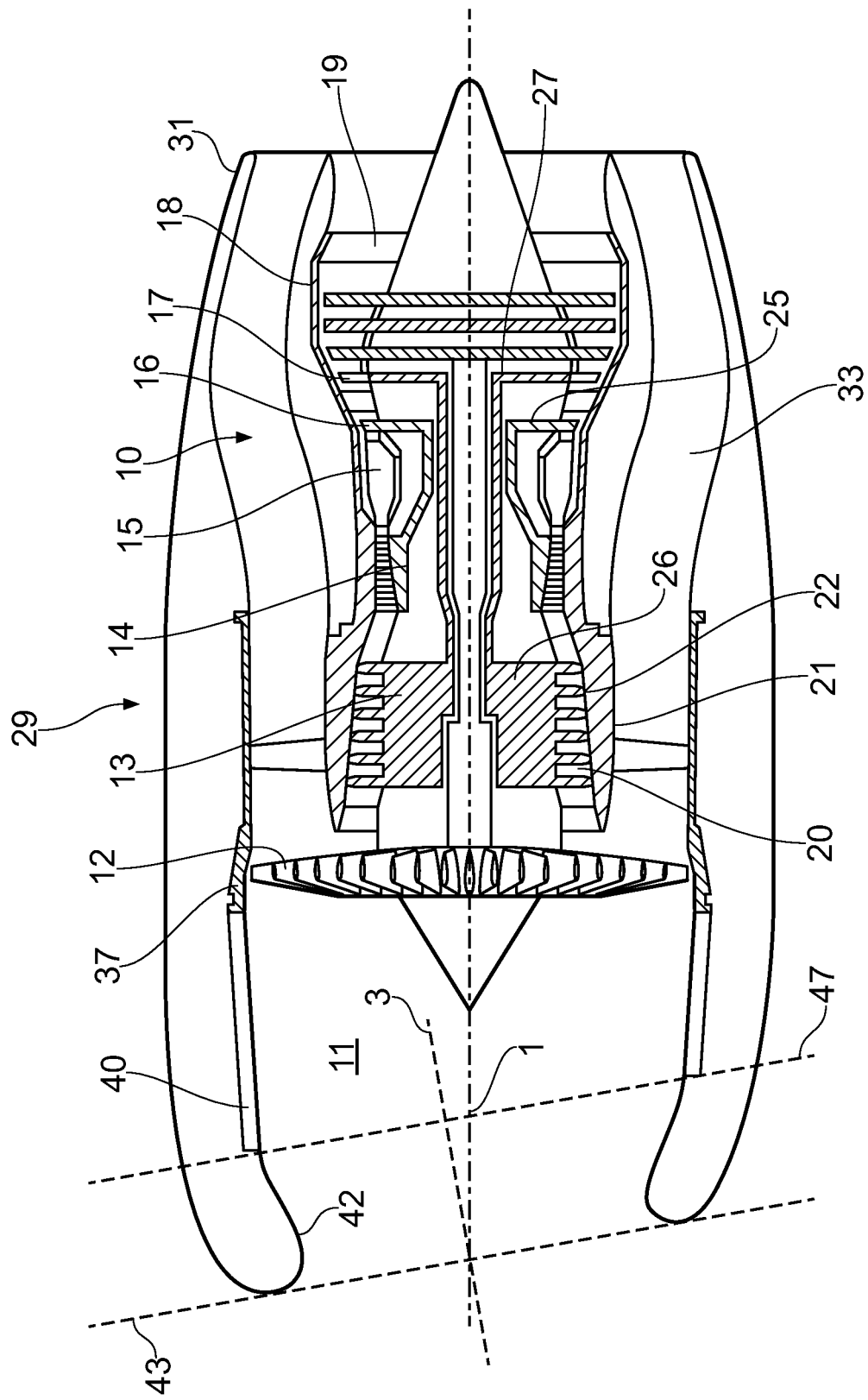
FIG. 1 depicts a nacelle and inlet barrel in accordance with the present invention.
Figure 2:
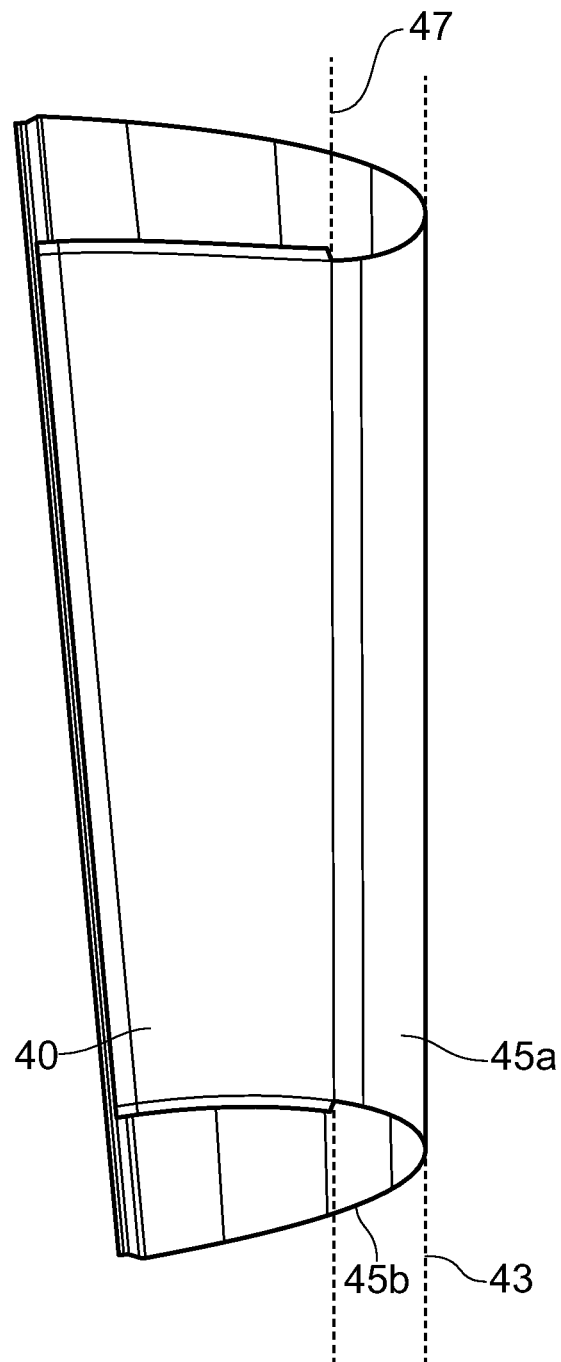
FIG. 2 depicts a view onto a segment of the inlet lip and inlet barrel shown in FIG. 1.

The gas turbine engine 29 shown in FIG. 1 is an example of a turbomachine, in which the invention may be applied. However, it is clear from the following that the invention can be used in other turbomachinery. The engine 10 is formed in a conventional manner and includes in axial flow series, an air intake 11, a fan 12, an intermediate pressure compressor 13, a high pressure compressor 14, a combustion chamber 15, a high pressure turbine 16, an intermediate pressure turbine 17 and a low pressure turbine 18 and an exhaust nozzle 19, all arranged around a central engine axis 1.

The intermediate pressure compressor 13 and the high pressure compressor 14 each include a plurality of stages, each of which has a rotor blade 22 and a stator vane 20. The blades are mounted to a compressor hub 26 and the stators to a compressor casing that also defines an annular flow channel through which, in use the working gas flows. The intermediate pressure compressor 13 is driven by the intermediate pressure turbine 17 through a shaft 27. The high pressure turbine 16 has a rotor 25 drives the high pressure compressor 14 and the low pressure turbine 18 drives the fan 12. An annular flow passage directs the working fluid through the turbine section to the exhaust nozzle 19.

The forward portion of a gas turbine engine incorporates the fan case 37, an inlet barrel 40 and a forward nacelle lip 42. The components together define the inlet of a duct 11 that supplies air to the rotating parts of the engine. It is important for the forward portion to minimise aerodynamic losses and turbulence in the air flow to the engine as these can have a detrimental effect on the efficiency of the engine.

The components therefore have a relatively complex and precise architecture which has to be carefully controlled. The size of the parts—up to four meters in diameter—also provide problems for manufacture and assembly of the forward portion. Manufacture and assembly of these parts is not a trivial task particularly when the optimum aerodynamic conditions are considered.

The fan case 37 is an annular component that is aligned to the longitudinal axis of the engine 1, which is the axis around which the fan, compressor and turbine rotates. The forward nacelle lip 42 is also an annular component but has an aerodynamic complexity to minimise the pressure loss of the intake at the maximum incidence the aircraft experiences in flight. For example, good pressure recovery at high incidence can be achieved by attempting to ensure that the air flow remains attached to the intake lip by drooping the nacelle highlight relative to the axis of the engine axis 1. The intake lip has an inner surface 45a and an outer surface 45b. The highlight 43 of the inlet is a closed loop running around the intake lip, and defines the boundary between lip inner and outer surfaces.

Generally the highlight 43 lies in a highlight surface which is either planar or is curved in only one principal direction. An axis (highlight axis) 3 extends normal to the plane to the highlight. On longitudinal sections through the engine containing the engine axis, the intake lip inner and outer surfaces are tangency matched at the highlight. Indeed the lip inner and outer surfaces may be tangential to the highlight surface at the highlight. However, although the curvatures of the inner surface 45a and the outer surface 45b are generally at a maximum at the highlight on a longitudinal section, these curvatures may not have the same maximum values.

The inlet barrel 40, which extends between the inlet lip and the fan case has a profile that gives a smooth transition between the inlet lip and the fan case. The barrel is not exactly axis-symmetric, like the fan casing, but its diameter varies as it extends axially such that it has a slightly smaller diameter at its forward end than at its rearmost end. The barrel may also have an axis that is not the same as the fan case axis, or engine axis. The inlet barrel and inlet lip are assembled along an assembly plane 47 axially offset from the highlight as shown in FIG. 1.

The barrel is designed to join with its neighbouring components with minimal steps and gaps that could lead to aerodynamic inefficiencies and turbulence. This is a complex join particularly when the size of the components, their relative differences in materials and alignment angles. Furthermore, manufacturing and assembly tolerances in these parts generate further complexities and although shims and other pieces may be used to compensate for these differences and tolerances, the additional parts required add weight, further complexity in manufacture, a sub-optimal load path and increased risk of foreign object ingestion should one of the shims become dislodged from its position.

The inlet lip, fan case and inlet barrel are manufactured separately and the inlet lip and barrel are joined together before being mounted to the fan case using a rearward flange on the inlet barrel.

Figure 3:
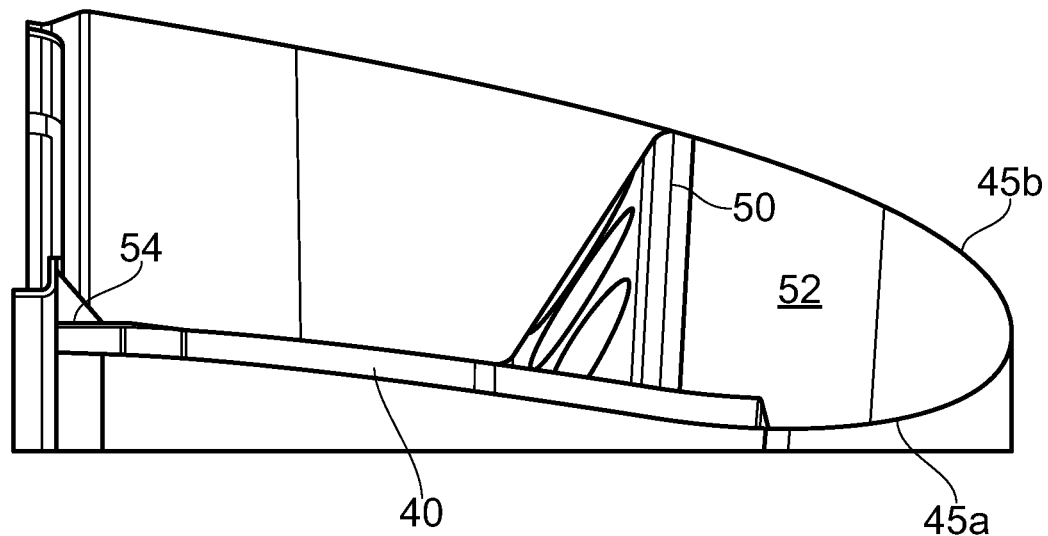
FIG. 3 depicts a cross-sectional view through the inlet barrel and inlet lip of FIG. 2

The joined inlet lip and barrel is shown in FIG. 3, where a forward bulkhead 50 is mounted to the radially outer surface of the barrel to provide support to the inlet lip. The inlet lip may be formed of a lightweight metal such as aluminium or more preferably a composite provided by one or more layers of composite plies or by utilising sandwich construction. Each composite ply may be formed from e.g. carbon or glass fibres embedded within a resin e.g. epoxy resin and the orientation of the fibres in each of the plies may be the same or different to the orientation of the fibres in an adjacent ply. The bulkhead 50, which may also be formed of a composite or metallic material, is formed with apertures within it to reduce the weight of the component and to provide access to the axially forward volume 52. The inlet lip supported by the inlet barrel and the bulkhead extends axially rearward of the bulkhead such that it terminates at approximately the same axial position as the inlet barrel. However, in some circumstances it may be desirable to terminate it forward or aft of this position depending on the design of the rest of the nacelle. It should be understood that the bulkhead 50 is optional.

At the rear of the inlet barrel a radially outwardly extending flange 54 provides a connection feature for connecting the inlet barrel to the fan casing. Whilst this flange is preferably integrally formed with the inlet barrel it may be separately formed and mechanically fastened or adhesively joined to the inlet barrel. The adhesive acting as a liquid shim whilst also offering a damping and sealing function.

Figure 4:
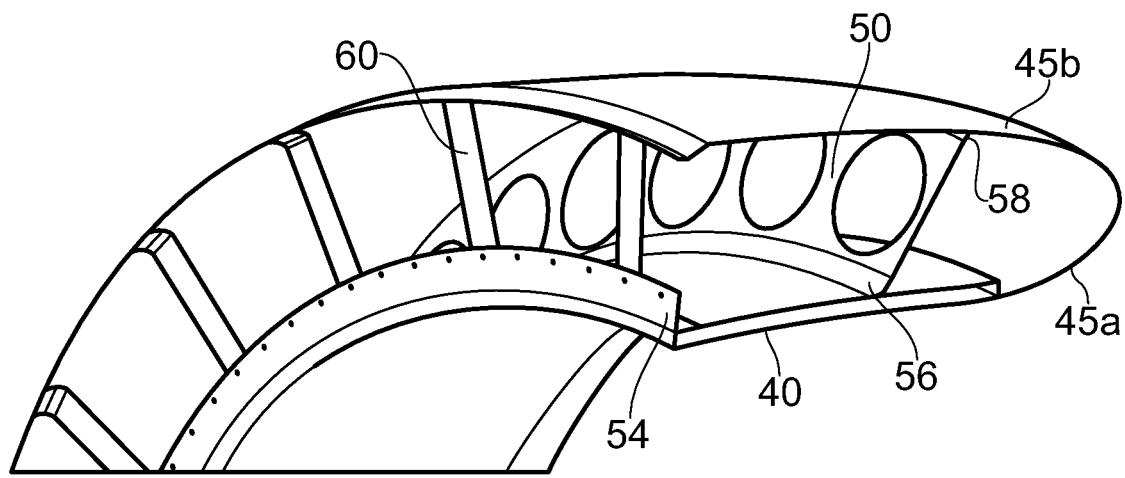
FIG. 4 depicts a perspective view of the arrangement of FIG. 3.

FIG. 4 depicts a perspective view of the arrangement of FIG. 3 in which the bulkhead 50 is arranged at an angle to the inlet barrel with a slope that extends forwardly as the bulkhead extends radially outwards. A rearwardly extending flange 56 on the bulkhead is provided to aid the join with the inlet barrel and a forwardly extending flange 58 on the bulkhead is provided to aid the join with the inlet lip.

Radially extending struts 60 are provided that extend from the inlet barrel flange that is used to join with the fan case, the struts giving support to the rearward portion of the inlet lip.

Figure 5:
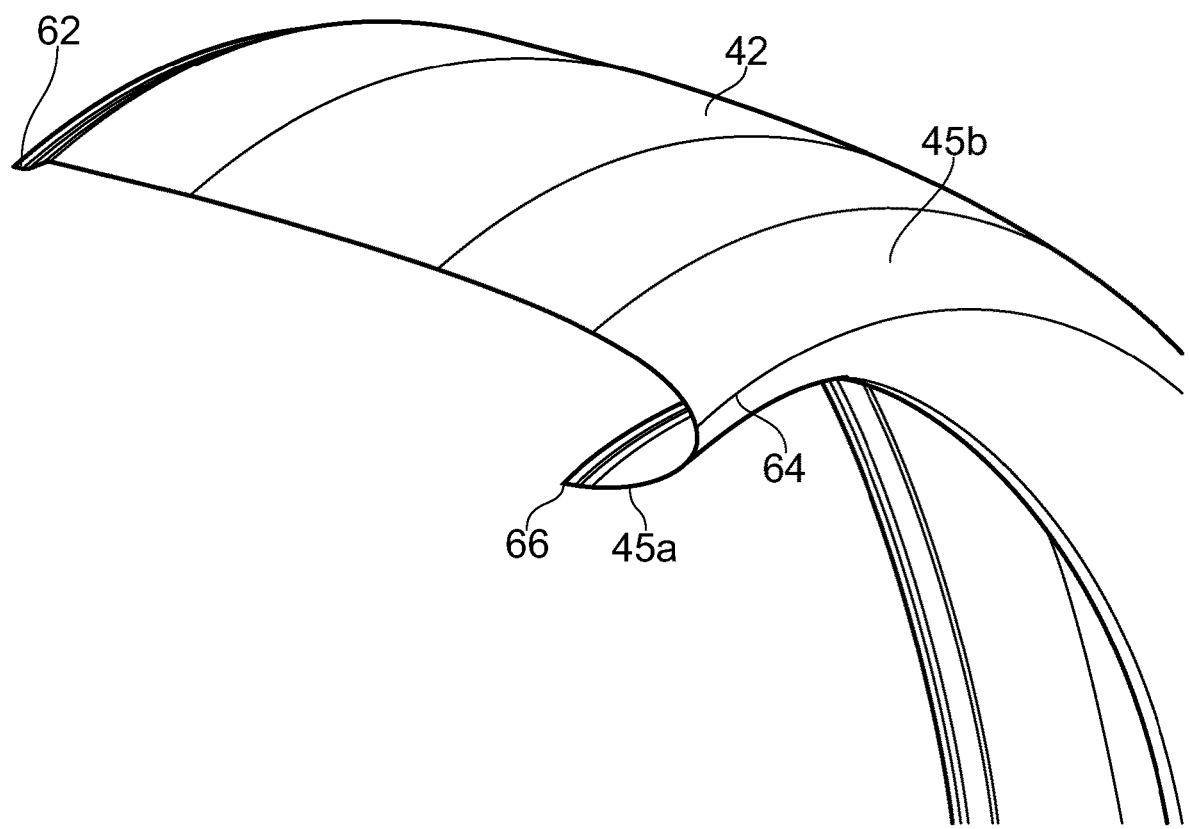
FIG. 5 depicts a perspective view of the inlet lip.

FIG. 5 shows a composite inlet lip 42 that is a single piece extending from its trailing edge 62 that interfaces with the rest of the nacelle through the curved leading edge 64 to its interface 66 with the inlet barrel. The component is formed of multiple plies of composite material and can have varying thickness that is provided by changing the number of plies in specific regions of the component and optionally with addition of foam or honeycomb. For example, along the extended length of the inlet lip 5 to 6 plies may be used to give a thickness of approximately 1.5 mm to 2 mm whilst, along the interface with the inlet barrel and around the leading edge 64, 13 to 14 plies may be used that give a localised thickness of 3 to 4 mm. In addition to the composite a sandwich layup may be used that can increase the localised thickness of the inlet tip to 12 mm or more, which can be used to give an increased structural characteristic.

At the trailing edge 62 the inlet lip has a radially inward joggle that interfaces with the nacelle to provide a smooth external surface. A seal (not shown) may be provided between the outer surface of the joggle and the inner surface of the nacelle. Other forms of interface could be used to achieve the same effect.

Figure 6:
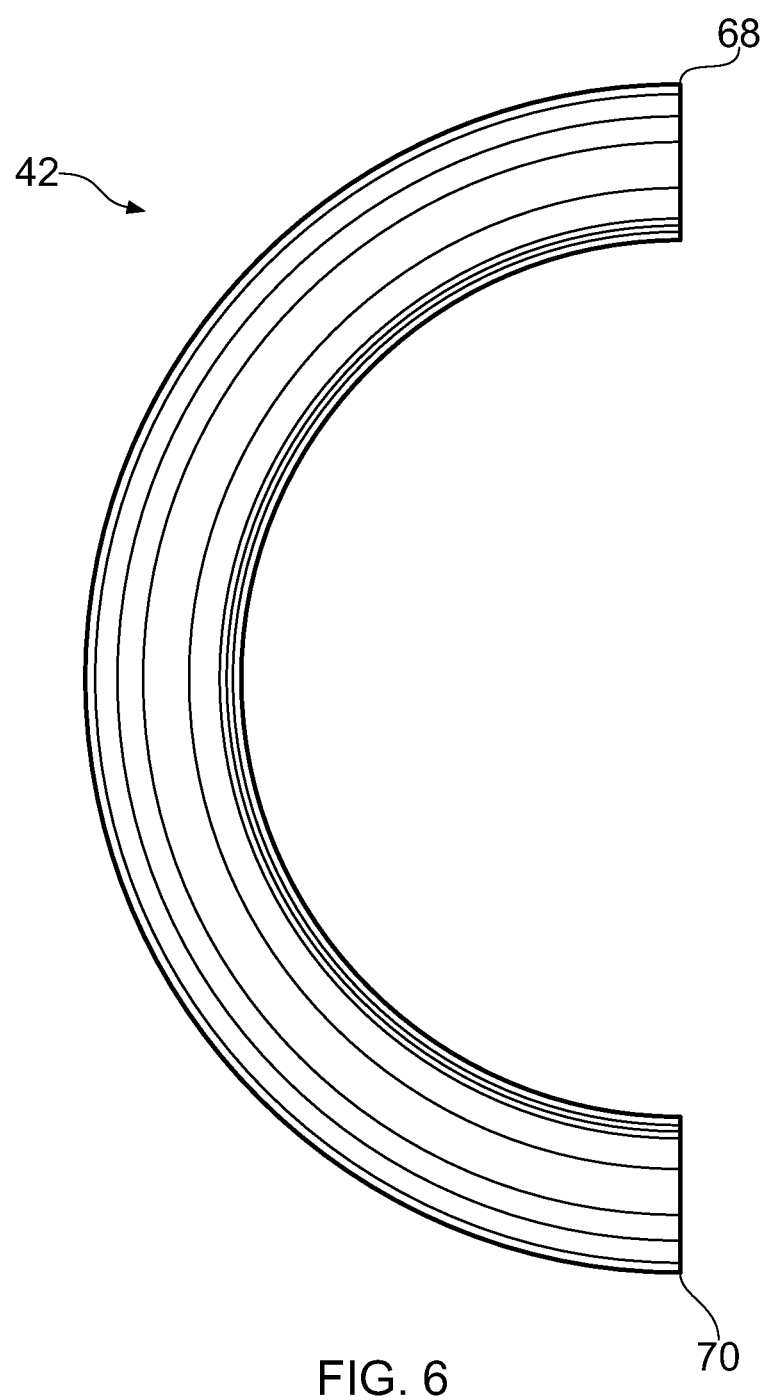
FIG. 6 shows a cross-sectional view from the rear of the inlet lip towards the front of the inlet lip.

As mentioned earlier, the inlet lip is a complex component designed to achieve an efficient transfer of air into the inlet barrel and then into the fan stage of the engine. At each point around the circumference the inlet lip can be described as having an inner surface 45a and an outer surface 45b that are tangency matched at the highlight 43 and have their maximum curvature at the highlight. However, these curvatures can be different for the inner and outer surfaces and can vary around the circumference too. These curvatures are represented by the front view onto the inlet lip shown in FIG. 6. The inlet lip, as discussed earlier is annular, but not truly circular around the axis and has a top dead centre position (TDC) 68 and a bottom dead centre (BDC) 70.

Further complexity in the inlet lip shape can be caused where the inlet lip is formed by composite material as the curing process used in its manufacture can cause the component to deviate from its design configuration.

The interface surface 66 of the inlet lip that joins with the inlet barrel is angled relative to the axis 3 that extends normal to the plane of the highlight. The angle of the interface surface varies around the circumference of the inlet lip. Exemplary details of the local conus angles are:

| Angular position from Top Dead Centre (TDC) of the inlet lip | Local conus angle (deg) | Change in angle (deg) |
| --- | --- | --- |
| 0 | 5.00 | 0 |
| 30 | 5.00 | 0 |
| 60 | 7.25 | 1.25 |
| 90 | 8.70 | 1.45 |
| 120 | 10 | 1.3 |
| 150 | 11 | 1.0 |
| 180 | 11.5 | 0.5 |
| 210 | 11 | −0.5 |
| 240 | 10 | −1.0 |
| 270 | 8.70 | −1.3 |
| 300 | 7.25 | −1.45 |
| 330 | 5.0 | −1.25 |

It will be noted that the rate at which the angle varies is different around the circumference of the inlet lip with the lowest rate of change being at the top and bottom of the engine and the highest rate of change being at 90 degrees and 270 degrees relative to the top of the engine.

In some embodiments where the difference in the maximum and minimum conus angles is too large for simple manufacture it is possible to develop a best fit conus angle which uses a constant tooling axis to machine the inlet barrel interface and the inlet lip interface. The tooling axis is different to both the highlight axis and the engine axis and represents a compromise angle that still permits a liquid shim to be used to provide a sealing join between the inlet lip interface and the inlet barrel interface.

Figure 7:
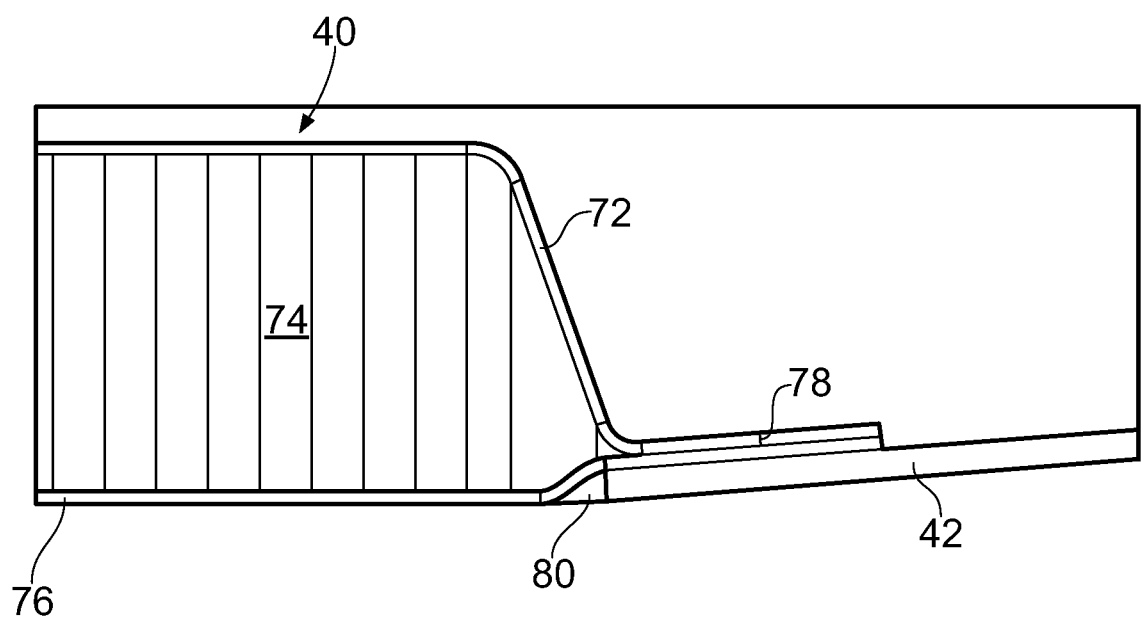
FIG. 7 depicts a detailed view of the joint between the inlet barrel and the inlet lip.

As shown in FIG. 7 the inlet barrel is formed of a noise absorbing article having a curved back-skin 72 with fore and aft side walls that together define a tray that supports a noise reducing material 74 such as, for example, a conventional honeycomb. The honeycomb is enclosed with a facing sheet 76 that forms the air washed surface of the barrel and is perforated for the noise lining purpose. The forward surface of the back-skin has a forwardly protruding flange 78 which has a radially inner and a radially outer surface, the radially inner surface providing a face supporting the inlet lip 42.

The facing sheet is preferably secured to the forward flange by a composite co-curing process but in a less preferred method could be adhesively, mechanically or otherwise secured to it. The alternative manufacturing method could be used, for example, where the barrel is predominantly formed of a non-composite material. The flange is offset outside the radial diameter of the facing skin by the thickness of the inlet lip trailing edge to provide a relatively smooth transition along the air-washed surface into the fan section of the engine. Excessive liquid shim material or another sealing material 80, such as an aero engine appropriate filler, may be used to complete the smooth transition from the inlet lip to the inlet barrel.

The flange 78 has a (divergent) cone angle from the highlight axis as it extends axially forward, the angle of the interface surface it provides varying with respect to the highlight axis in accordance with the changes to the local annulus line profiles described above. This aids assembly of the inlet lip to the inlet barrel by reducing the need for complex shims that may be required to ensure close contact of the inlet lip and the inlet barrel because of achievable tolerances. A layer of a liquid shim between the inlet barrel interface and the inlet lip interface may be used to provide an appropriate join strength and flexibility should slight movement be required between the two components, in addition to fasteners. A layer of adhesive also provides a sealing effect that limits the passage of air through the join and excess adhesive could be used to provide the smooth transition 80.

Where the variation in cone angle of the flange interface surface or inlet lip interface surface is significant due to a particularly complex highlight plane, or for other reasons, it may be necessary or desirable for manufacturing or other reasons to compromise the local conus angles of the interface surfaces and provide conus angles that does not vary locally around the circumference of each part. The conus angle is selected to be a best fit that permits a liquid shim to be used though it will be appreciated that the local thickness of the liquid shim will vary.

It will be appreciated that the arrangement provides a number of further advantages. For example there is a reduced number of parts and the possibility of using a greater noise lining area in the inlet barrel. By looking to match the angles of the interface surfaces of the inlet lip and the inlet barrel the assembly and processes can be simplified and the join made more robust by providing significant surface area for adhesive, or other mechanical joining methods. The join is more precise than conventional methods and requires less manual labour and skill and thus reduces errors in manufacture. The risk of improper circumferential alignment between the inlet lip and the inlet barrel is also reduced because of the change in local conus angle that limits the ability to mount the inlet lip to the inlet barrel when the inlet lip is rotated relative to the inlet barrel. The use of single, best fit angle with a compromised tooling direction simplifies manufacture whilst still permitting the use of a liquid shim.

While the invention has been described in conjunction with the exemplary embodiments described above, many equivalent modifications and variations will be apparent to those skilled in the art when given this disclosure.

The invention claimed is:

1. An inlet for a gas turbine engine, the inlet, in flow series, comprising:
   an inlet lip having a highlight defining a boundary between inner and outer surfaces of the inlet lip, and on all longitudinal sections through the inlet that contain a longitudinal axis of the inlet (i) the inner and outer surfaces having respective tangents coincident on the highlight, and (ii) the inner and outer surfaces each having a maximum curvature at the highlight, the highlight having an axis extending normal to the highlight; and
   an inlet barrel extending between the inlet lip and a fan case of the gas turbine engine, the inlet barrel having an air-washed surface forming an inner surface of the inlet barrel and a curved back-skin defining an outer surface of the inlet barrel, the air-washed surface and the back-skin defining a cavity in which a noise reducing material is disposed in a honeycomb shape and enclosed with a perforated facing sheet, the air-washed surface and the back-skin converging to contact each other and to form a forwardly extending flange joined to the inlet lip, the flange extending from an inner side of the inlet barrel to an outer side of the inner surface of the inlet lip, the outer side of the inner surface of the inlet lip facing the outer surface of the inlet lip and extending axially rearward of the flange and extending axially rearward of at least a joined portion of the air-washed surface and the back-skin of the inlet barrel in an axial direction of the inlet, and a shim is inserted into a gap formed between the outer surface of the air washed surface, a radially inner surface of the flange, and an edge of the inlet lip, wherein the shim fills the gap.

2. The inlet for the gas turbine engine according to claim 1, wherein the flange has an interface surface and the inlet lip has an interface surface, the inlet lip and the flange being joined at their respective interface surfaces.

3. The inlet for the gas turbine engine according to claim 2, wherein the flange interface surface is located radially outside the inlet lip interface surface.

4. The inlet for the gas turbine engine according to claim 3, wherein the flange interface surface has a conus angle divergent from the highlight axis as the flange interface surface extends axially forward.

5. The inlet for the gas turbine according to claim 4, wherein a minimum conus angle of the flange interface surface and/or a minimum conus angle of the inlet lip interface surface is 5 degrees from the highlight axis.

6. The inlet for the gas turbine according to claim 4, wherein a maximum conus angle of divergence of the flange interface surface and/or a maximum conus angle of convergance of the inlet lip interface surface is 11.5 degrees from the highlight axis.

7. The inlet for the gas turbine according to claim 6, wherein the conus angle of the flange interface surface and/or a conus angle of the inlet lip interface surface varies around a circumference of the inlet.

8. The inlet for the gas turbine according to claim 7, wherein a rate of change of the conus angle of the flange interface surface and/or a rate of change of the conus angle of the inlet lip interface surface is at a minimum at a top dead center of the gas turbine.

9. The inlet for the gas turbine according to claim 7, wherein a rate of change of the conus angle of the flange interface surface and/or a rate of change of the conus angle of the inlet lip interface surface is at a maximum at 90 degrees around the circumference to a top dead center of the gas turbine.

10. The inlet for the gas turbine according to claim 4, wherein a minimum conus angle of the flange interface surface and/or a minimum conus angle of the inlet lip interface surface is located at a top dead center of the gas turbine when viewed from a front of the gas turbine.

11. The inlet for the gas turbine according to claim 4, wherein a maximum conus angle of the flange interface surface and/or a maximum conus angle of the inlet lip interface surface is located at a bottom dead center of the gas turbine when viewed from a front of the gas turbine.

12. The inlet for the gas turbine according to claim 4, wherein the conus angle of the flange interface surface and/or a conus angle of the inlet lip interface surface varies around a circumference of the inlet.

13. The inlet for the gas turbine according to claim 12, wherein a rate of change of the conus angle of the flange interface surface and/or a rate of change of the conus angle of the inlet lip interface surface increases to a maximum and then decreases to a minimum around the circumference of the inlet.

14. The inlet for the gas turbine according claim 12, wherein the flange and the inlet lip are secured together by the shim, which is a liquid shim.

15. The inlet for the gas turbine according to claim 4, wherein the conus angle of the flange interface surface and/or a conus angle of the inlet lip interface surface is constant around a circumference of the inlet, wherein the flange and the inlet lip are separated by the shim, which is a liquid shim, a thickness of the liquid shim varying around the circumference of the inlet.

16. The inlet for the gas turbine engine according to claim 3, wherein the inlet lip interface surface has a conus angle convergent towards the highlight axis as the inlet lip interface surface extends axially rearward.

* * * * *